United States Patent
Zhang et al.

(10) Patent No.: US 10,632,954 B2
(45) Date of Patent: Apr. 28, 2020

(54) AIRBAG ASSEMBLY AND VEHICLE SEAT PROVIDED WITH AIRBAG ASSEMBLY

(71) Applicant: Autoliv Development AB, Vårgårda (SE)

(72) Inventors: Jin Zhang, Shanghai (CN); Kongfu Xie, Shanghai (CN); Magdalena Wingren, Vårgårda (SE); Mats Berntsson, Göteborg (SE); Par Sandinge, Alingsås (SE)

(73) Assignee: Autoliv Development AB, Vargarda (SE)

( * ) Notice: Subject to any disclaimer, the term of this patent is extended or adjusted under 35 U.S.C. 154(b) by 78 days.

(21) Appl. No.: 15/738,410

(22) PCT Filed: Jun. 7, 2016

(86) PCT No.: PCT/CN2016/085171
§ 371 (c)(1),
(2) Date: Dec. 20, 2017

(87) PCT Pub. No.: WO2016/206538
PCT Pub. Date: Dec. 29, 2016

(65) Prior Publication Data
US 2018/0178748 A1    Jun. 28, 2018

(30) Foreign Application Priority Data
Jun. 26, 2015  (CN) .......................... 2015 1 0363874

(51) Int. Cl.
*B60R 21/231*    (2011.01)
*B60R 21/2338*   (2011.01)
(Continued)

(52) U.S. Cl.
CPC ...... *B60R 21/23138* (2013.01); *B60R 21/207* (2013.01); *B60R 21/2338* (2013.01);
(Continued)

(58) Field of Classification Search
CPC .......................... B60R 21/2338; B60R 21/207
See application file for complete search history.

(56) References Cited

U.S. PATENT DOCUMENTS 5,899,489 A * 5/1999 Jost ...................... B60N 2/4235
                                                    280/730.2
7,712,766 B2   5/2010 Gutmann et al.
(Continued)

FOREIGN PATENT DOCUMENTS

CN        101096198 A    1/2008
CN        103717458 A    4/2014
(Continued)

OTHER PUBLICATIONS

International Search Report for PCT/CN2016/085171, ISA/CN, Haidian District, Beijing, dated Aug. 31, 2016.
(Continued)

*Primary Examiner* — Nicole T Verley
(74) *Attorney, Agent, or Firm* — Stephen T. Olson; Harness, Dickey & Pierce, P.L.C.

(57) ABSTRACT

The present disclosure relates to an airbag assembly and a vehicle seat comprising the airbag assembly. The airbag assembly is adapted to be mounted at a side of a vehicle front seat away from its neighboring vehicle door, and includes a folded airbag adapted to be inflated with gas and to be connected to a backrest frame of the vehicle front seat; and a tether for controlling deployment of the airbag. A first end of the tether is connected to the airbag and a second end of the tether is adapted to be connected to the backrest frame. The airbag is configured to be restrained by the tether and the filling so as to be disposed along a side contour of the backrest frame in a bent state.

16 Claims, 2 Drawing Sheets

(51) Int. Cl.
*B60R 21/2342* (2011.01)
*B60R 21/207* (2006.01)

(52) U.S. Cl.
CPC *B60R 21/2342* (2013.01); *B60R 2021/23146* (2013.01); *B60R 2021/23388* (2013.01)

(56) References Cited

U.S. PATENT DOCUMENTS

| | | | |
|---|---|---|---|
| 9,132,798 B2 * | 9/2015 | Yasuoka | B60R 21/2334 |
| 9,296,352 B2 | 3/2016 | Fujiwara et al. | |
| 10,112,570 B2 * | 10/2018 | Barbat | B60N 2/90 |
| 2008/0012271 A1 | 1/2008 | Gutmann et al. | |
| 2014/0151984 A1 | 6/2014 | Fukawatase et al. | |
| 2014/0183846 A1 | 7/2014 | Fujiwara et al. | |
| 2015/0084315 A1 | 3/2015 | Acker et al. | |

FOREIGN PATENT DOCUMENTS

| | | | | |
|---|---|---|---|---|
| CN | 104379411 A | | 2/2015 | |
| DE | 19646698 A1 * | | 5/1997 | B60R 21/207 |
| DE | 10032106 A1 | | 1/2002 | |
| DE | 102010039882 A1 | | 3/2011 | |
| DE | 102016010249 A1 * | | 3/2018 | B60R 21/23138 |
| EP | 1132261 A1 | | 9/2001 | |
| EP | 1873023 A1 | | 1/2008 | |
| EP | 3315364 A2 | | 5/2018 | |
| GB | 2293355 A * | | 3/1996 | B60N 2/4235 |
| GB | 2562607 A * | | 11/2018 | B60R 21/207 |
| JP | H09-309399 A | | 12/1997 | |
| JP | 2008007104 A | | 1/2008 | |
| JP | 2008-120146 A | | 5/2008 | |
| JP | 5952680 B2 * | | 7/2016 | |
| JP | 5999061 B2 * | | 9/2016 | B60R 21/2334 |
| WO | WO-2010/086124 A1 | | 8/2010 | |

OTHER PUBLICATIONS

Written Opinion of the ISA for PCT/CN2016/085171, ISA/CN, Haidian District, Beijing, dated Aug. 31, 2016.
European Patent Register Partial EP Search Report for EP 16 81 354 (published as EP 3315364 A2, EPO Berlin, dated Oct. 5, 2018 with related documents.
Office Action from the Korea Intellectual Property Office regarding application No. 10-2017-7035968 dated Jan. 19, 2019.

* cited by examiner

AIRBAG ASSEMBLY AND VEHICLE SEAT PROVIDED WITH AIRBAG ASSEMBLY

CROSS REFERENCE TO RELATED APPLICATIONS

This application is a U.S. National Phase Application under 35 U.S.C. 371 of International Application No. PCT/CN2016/085171, filed on Jun. 7, 2016 and published in Chinese as WO 2016/206538 A2 on Dec. 29, 2016. This application claims the benefit of priority from Chinese Patent Application No. 201510363874.8 filed Jun. 26, 2015. The entire disclosures of the above applications are incorporated herein by reference.

TECHNICAL FIELD

The present disclosure relates to an airbag assembly for vehicle, and more particularly, to a side airbag to be mounted at a vehicle seat and a seat having the same.

BACKGROUND

In existing vehicles, an airbag is a very important safety device and can be inflated and deployed during a vehicle collision. The airbag can prevent rigid impact between passengers and interiors of a vehicle, thereby avoiding or reducing injuries of the passengers. The airbag generally comprises driver airbag, passenger airbag, side airbag, curtain airbag, knee airbag and the like. The side airbag is usually mounted at a lateral side of a seat, and is located between a passenger and a vehicle door when it is deployed to damp impact between a side portion of the vehicle and the passenger.

When a vehicle suffers a side collision, a passenger may dash in a direction away from its adjacent vehicle door, or an impact between two passengers in a row may occur when they dash towards each other. In this case, there is a high risk of injury to the passenger's head, neck, waist and other body regions. As such, a side airbag mounted at a far side of front seat has been developed, generally known as far-side airbag or central side airbag. The far-side airbag can be deployed between two seats in a row, and provide a support for passenger at a central side of the passenger or reduce impact between passengers in front seats when a vehicle suffers a side collision or a rollover.

To provide multiple supports at passenger's head, shoulder, waist and other regions, the far-side airbag module is designed in a large size. Existing far-side airbag module has a rectangular cuboid shape, which has a large height as compared to a vehicle seat backrest. FIG. 1 a schematic view for showing a far-side airbag module 100 mounted at a backrest frame 200 of a vehicle seat in prior art. As shown in FIG. 1, the far-side airbag module 100 having a substantially rectangular cuboid shape is mounted at the backrest frame 200 in an upright state. In this case, when the far-side airbag module 100 with a large size is encapsulated within a seat foam (not shown), there is a great challenge for foam moulding of the seat. For example, as compared to a side airbag mounted at a side of a seat near to its neighboring vehicle door, the far-side airbag has a larger size and thus a larger design space for the foam moulding is required, and may cause a left-right asymmetry of the seat.

Given the above problems, there is needed a far-side airbag which can be easily installed, occupy a small space and have a good seat appearance.

SUMMARY

The disclosure provides a creative method for mounting a side airbag assembly to a seat in its bent state. An object of the disclosure is to provide a far-side airbag assembly and a vehicle seat with the same in which airbag deployment can be advantageously controlled. Another object of the disclosure is to provide a far-side airbag assembly and a vehicle seat with the same which provide a better seat appearance. Another object of the disclosure is to provide a far-side airbag assembly and a vehicle seat with the same which occupies a small space. Another object of the disclosure is to provide a far-side airbag assembly and a vehicle seat with the same which provide a better lateral safety protection for passengers.

There is provided an airbag assembly for a vehicle front seat, wherein the vehicle front seat comprises a backrest frame and a filling, wherein the airbag assembly is adapted to be mounted at a lateral side of the backrest frame, the airbag assembly comprising: a folded airbag adapted to be inflated with gas and to be connected to the backrest frame; and a tether for controlling deployment of the airbag, wherein a first end of the tether is connected to the airbag and a second end of the tether is adapted to be connected to the backrest frame, wherein the airbag assembly is adapted to be mounted at a side of the vehicle front seat away from its neighboring vehicle door, and wherein the airbag is configured to be restrained by the tether and the filling so as to be disposed along a side contour of the backrest frame in a bent state.

In the above airbag assembly, the airbag can be folded into the folded state when it is not inflated. When the airbag assembly is mounted at the seat backrest frame of the vehicle, the airbag is restrained by the tether and the filling so as to be disposed along a side contour of the backrest frame in a bent state. When the airbag is being inflated with gas, the airbag will be unfolded in a direction away from the backrest frame from its folded state, thus the airbag can be finally deployed in its upright state.

With the above airbag assembly, the tether connecting the seat backrest frame and the airbag can restrain the deploying process of the airbag, such as speed, shape and/or direction of the deployment of the airbag, such that the airbag can be prevented from inflating too fast to injure passengers and can provide a better protection for passengers as designed.

With the above airbag assembly, the airbag assembly can be substantially pressed against the backrest frame of the vehicle seat in a bent state. Therefore, compared to an airbag assembly mounted at the seat in an upright state, the airbag assembly according to the disclosure can be in a close fit with the seat backrest frame, which facilitates subsequent foam molding and attractive appearance of the seat.

With the above airbag assembly, if the airbag assembly is mounted at the side of the vehicle front seat away from its neighboring vehicle door (a side close to the vehicle center), it is possible to improve a safety protection between the front seats, especially the passenger protection when the vehicle suffers a side collision, and reduce potential injuries resulted from lateral movement of passengers.

According to an aspect of the disclosure, the tether comprises a folded portion which is formed from a section of the tether being folded and a fixed portion which is disposed at the folded portion to retain the folded portion, and wherein when the airbag is being inflated with gas, the fixed portion can be broken such that the folded portion of the tether will be unfolded gradually from its folded state.

According to an aspect of the disclosure, the fixed portion of the tether comprises tear stitching which is sewed with thread in the folded portion.

With a portion of the tether being pre-folded and fixed, it is possible to further restrain the deployment of the tether, such as retarding the deploying process and/or controlling the deployment direction. Furthermore, with a portion of the tether being pre-folded and fixed, it is possible to firmly press the airbag assembly against the side contour of the backrest frame such that a space occupied by the airbag assembly within the seat can be further reduced and there will be more design space for the vehicle seat and the vehicle with the same.

According to an aspect of the disclosure, the tether and the airbag are integrally formed. With the integrally formed tether and airbag, it is possible to omit a connecting process of the tether to the airbag and thus improve production efficiency and reduce manufacture cost. Furthermore, with the integrally formed tether and airbag, it is possible to improve a joint strength between the tether and the airbag and avoid a tearing between the tether and the airbag during the deployment of the airbag, thereby controlling the airbag deployment more effectively to provide a side support for passenger.

According to an aspect of the disclosure, the airbag can be directly connected to the backrest frame. When the airbag is directly connected to the backrest frame without the housing, it is possible to further reduce the space occupied by the airbag assembly and reduce process steps for manufacturing and assembling the airbag assembly. Therefore, there will be more design space for the vehicle seat and the vehicle with the same. Furthermore, the production efficiency is improved and the manufacture cost is reduced.

According to an aspect of the disclosure, the airbag can be connected to the backrest frame through a bracket, and wherein the bracket comprises a first end for connecting to the tether and a second end for connecting to the backrest frame. With the backrest connecting the tether and the backrest frame, the tether can be used for fixing the airbag and controlling the airbag deployment at the same time. It is possible to reduce components for fixing the airbag, and improve production efficiency and reduce manufacture cost of the airbag assembly while the airbag assembly is firmly connected to the backrest frame.

According to an aspect of the disclosure, the airbag assembly further comprises an airbag housing for at least partly storing the folded airbag, wherein the airbag can be at least partly connected to the backrest frame through the airbag housing. With the above airbag assembly, the airbag is stored in the airbag housing. It is possible to store the airbag more securely and improve reliability of the airbag assembly.

According to an aspect of the disclosure, the airbag housing is formed of flexible woven fabric, and wherein the folded airbag is entirely contained in the airbag housing, the airbag housing is configured to be disposed along a side contour of the backrest frame, and at least a part of the airbag housing can be pressed against a bent portion of the backrest frame in a bent state.

With the airbag housing entirely formed of flexible materials (such as flexible woven fabric), it is possible to bend the airbag housing to adapt to different shapes. When the flexible portion is disposed according to the shape of the backrest frame, it is possible to improve installation adaptability of the airbag assembly. Therefore, the airbag housing storing the airbag therein can be pressed against the backrest frame of the vehicle seat in a bent state. Compared to an airbag assembly mounted at the seat in an upright state, the airbag assembly according to the disclosure can be in a close fit with the seat backrest frame, which facilitates subsequent foam molding and attractive appearance of the seat.

According to an aspect of the disclosure, the airbag housing is designed such that when the airbag assembly is mounted to the backrest frame, a lower portion of the airbag is stored in the airbag housing while an upper portion of the airbag extends beyond the airbag housing, and wherein the lower portion of the airbag is connected to the backrest frame through the airbag housing, and the upper portion of the airbag is directly connected to the backrest frame and can be pressed against a bent portion of the backrest frame in a bent state.

With the above structure, an upper end of the airbag housing is not closed such that the airbag can have a lower portion stored in the airbag housing and an upper portion extending beyond the airbag housing and directly connected to the seat backrest frame. Therefore, the housing may be formed of various materials when the housing is used to store the folded airbag.

There is also provided a vehicle seat comprising: a backrest frame; a filling; and an airbag assembly mounted at a lateral side of the backrest frame, comprising: a folded airbag adapted to be inflated with gas and connected to the backrest frame; and a tether for controlling deployment of the airbag, wherein a first end of the tether is connected to the airbag and a second end of the tether is connected to the backrest frame, wherein the vehicle seat is a front vehicle seat, and the airbag assembly is mounted at a side of the vehicle front seat away from its neighboring vehicle door, and wherein the airbag is configured to be restrained by the tether and the filling so as to be disposed along a side contour of the backrest frame in a bent state.

BRIEF DESCRIPTION OF THE DRAWINGS

Features, advantages and technical significance of exemplary embodiments of the disclosure will be described below with reference to the accompanying drawings, in which like numerals denote like elements, and wherein.

DETAILED DESCRIPTION

Exemplary embodiments will be described below in detail with reference to the drawings. It should be noted that the following description and drawings are merely provided for describing principles of the present invention. The present invention is not limited to the described preferred embodiments. The scope of the invention is defined by the accompanying claims.

Figure 1:
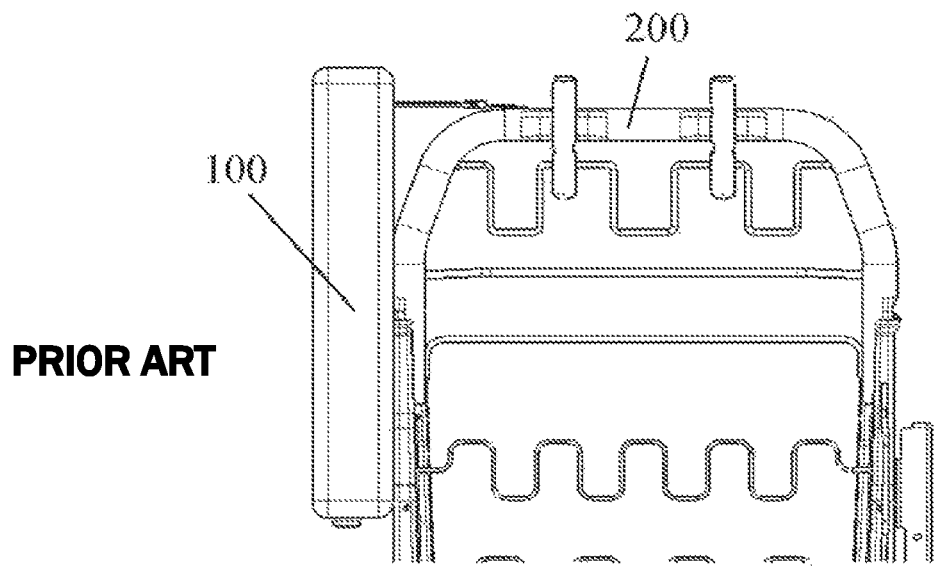
FIG. 1 is a schematic view for showing a far-side airbag module mounted at a backrest frame of a vehicle seat in prior art.
Figure 2:
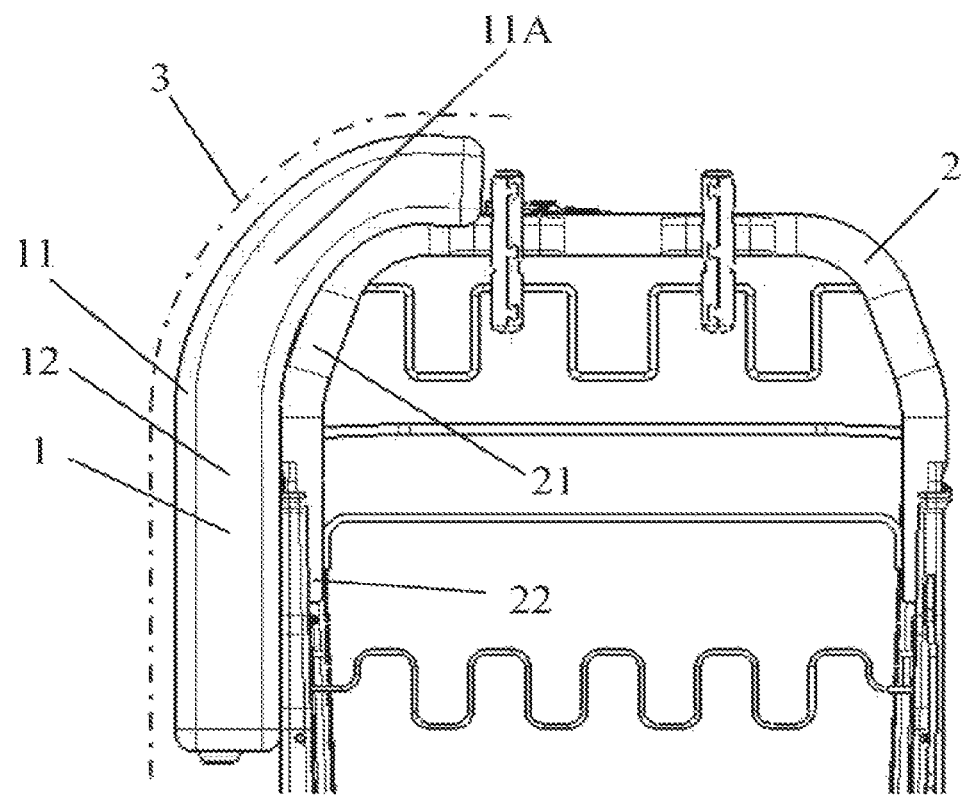
FIG. 2 is a schematic view for showing an airbag assembly and a state in which the airbag assembly is mounted at a seat backrest frame of a vehicle according to an embodiment of the disclosure.

FIG. 2 is a schematic view for showing an airbag assembly 1 according to an embodiment of the disclosure. As shown in FIG. 2, the airbag assembly 1 comprises an airbag housing 11 and an airbag 12. In an uninflated state, the airbag 12 is folded and stored in the airbag housing 11. The airbag 12 can be folded in the airbag housing 11 in any way as required, so long as the airbag 12 after being inflated can provide proper protect for passengers. The airbag 12 can be made of flexible materials (such as flexible woven fabric). The airbag assembly 1 further comprises an inflator, an igniter, a sensor, an electronic controller unit (ECU) and the like.

The airbag housing 11 is designed to store the folded airbag 12 therein. Optionally, the airbag housing may accommodate one or more of the inflator, the igniter, the sensor and the electronic controller unit (ECU).

According to an embodiment, the airbag housing 11 is designed to store the entire airbag 12 therein. In this case, at least a part of the airbag housing 11 is a flexible portion 11A. The flexible portion 11A can be bent if an external force acts on it. According to an embodiment, the flexible portion 11A is formed of flexible materials, such as flexible woven fabric. According to another embodiment, the airbag housing 11 can be completely made of flexible materials (such as flexible woven fabric).

According to some embodiments of the disclosure, when the airbag housing 11 storing the airbag 12 therein is mounted at a seat backrest frame of a vehicle, the flexible portion 11A can be acted on by an external force and thus can be pressed against a bent portion of the seat backrest frame in a bent state. According to an embodiment of the disclosure, the flexible portion 11A is an upper portion of the airbag housing 11. That is to say, when the airbag housing 11 is mounted at the seat backrest frame of the vehicle, the flexible portion 11A is a portion close to a seat headrest.

FIG. 2 further shows a state in which the airbag assembly 1 is mounted at a seat backrest frame 2 of a vehicle according to an embodiment of the disclosure. As shown in FIG. 2, the airbag housing 11 storing the airbag 12 therein is connected to the seat backrest frame 2. According to an embodiment, the flexible portion 11A of the airbag housing 11 is connected to a bent portion 21 of the seat backrest frame 2, and a lower portion of the airbag housing 11 is fixed to a straight portion 22 of the seat backrest frame 2. For example, the lower portion of the airbag housing 11 can be connected to the straight portion 22 of the seat backrest frame 2 through bolt, snap-fit, adhesive and the like.

As shown in FIG. 2, the flexible portion 11A of the airbag housing 11 is substantially pressed against the bent portion 21 of the seat backrest frame 2 in a bent state. According to an embodiment of the disclosure, the flexible portion 11A that has been bent is releasably connected to the bent portion 21 of the seat backrest frame 2. For example, the flexible portion 11A can be releasably connected to the seat backrest frame 2 through tether, stitching, hook-and-loop fastener, snap-fit, clasp and the like. With the flexible portion 11A releasably connected to the seat backrest frame 2, when the airbag 12 is inflated with gas, the flexible portion 11A of the airbag housing 11 will be released from the seat backrest frame 2. Accordingly, the flexible portion 11A will gradually return to a substantially upright state from the bent state as the airbag 12 is being inflated, thus the airbag 12 can be finally deployed in its substantially upright state.

A filling 3 is filled around the airbag assembly 1 and the seat backrest frame 2. When the flexible portion 11A of the airbag housing 11 is connected to the seat backrest frame 2 in a bent state, the filling 3 surrounds the flexible portion 11A and thus further restrains the flexible portion 11A in its bent state. According to an embodiment of the disclosure, the filling 3 is a foam filling formed in foaming process. With the filling 3 surrounding the airbag assembly 1 and the seat backrest frame 2, it is possible to stably maintain the flexible portion 11A in the bent state, such that it is avoided to release the connection of the flexible portion 11A and the seat backrest frame 2 before the airbag 12 is inflated, thereby improving reliability of the airbag assembly 1.

Figure 3:
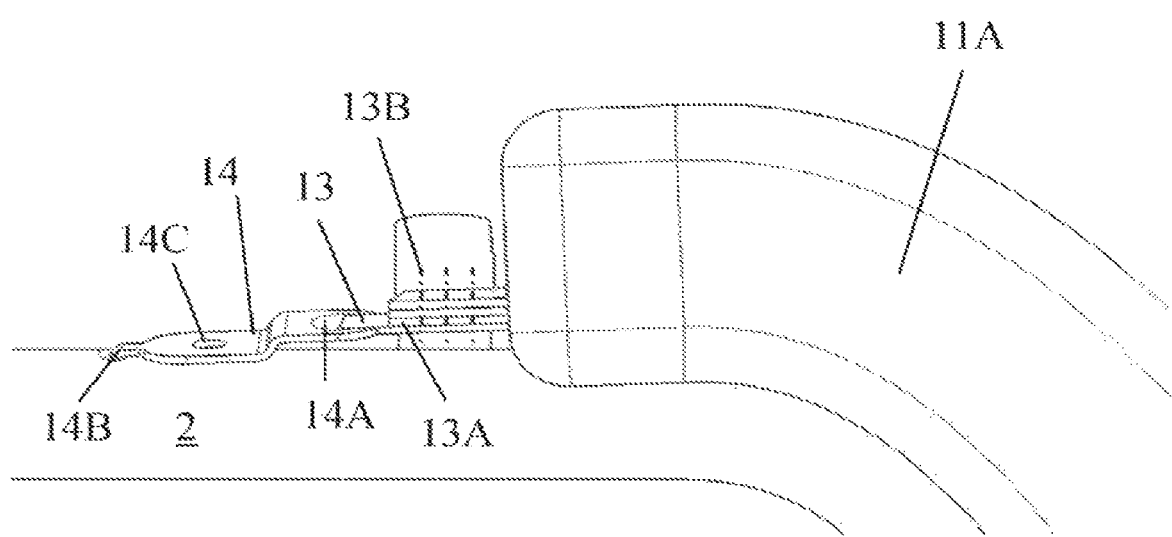
FIG. 3 is a schematic view for showing an airbag assembly comprising a tether and mounted at a backrest frame of a vehicle seat according to an embodiment of the disclosure.

According to an embodiment of the disclosure, the airbag assembly 1 further comprises a tether 13 provided on the airbag 12. FIG. 3 is a schematic view for showing an airbag assembly 1 comprising a tether 13 and mounted at a seat backrest frame 2 of a vehicle according to an embodiment of the disclosure. As shown in FIG. 3, a first end of the tether 13 is connected to the airbag 12 and a second end of the tether 13 is connected to the seat backrest frame 2.

According to an embodiment of the disclosure, the tether 13 and the airbag 12 can be integrally formed. For example, the tether 13 and the airbag 12 can be integrally formed of flexible materials (such as flexible woven fabric). According to an embodiment of the disclosure, the tether 13 may be formed separately and then connected to the airbag 12. For example, the separately formed tether 13 may be connected to the airbag 12 through stitching, rivet, bolt, adhesive and the like.

The tether 13 can be configured to control deployment of the airbag assembly 1. When the airbag 12 is being inflated, the airbag housing 11 and the airbag 12 will gradually return to a substantially upright state from the bent state, and the tether 13 will extend between the airbag 12 and the seat backrest frame 2 as the airbag 12 is being gradually deployed. As such, the tether 13 can restrain speed, shape and/or direction of the deployment of the airbag 12, such that the airbag 12 can be prevented from inflating too fast to injure passengers and can be deployed in a predetermined way to provide a better protection for passengers.

The flexible portion 11A as described above can be connected to the seat backrest frame 2 through a releasable connection. Alternatively or additionally, the tether 13 can be configured to releasably connect the airbag housing 11 to the seat backrest frame 2. For example, with a releasable connection on the tether 13, the tether 13 releasably connects the airbag 12 stored in the airbag housing 11 to the seat backrest frame 2, such that the airbag housing 11 is releasably connected to the seat backrest frame 2.

According to an embodiment of the disclosure, the tether 13 connected to the airbag 12 can be connected to the seat backrest frame 2 through a bracket. As shown in FIG. 3, a bracket 14 is provided to connect the airbag 12 to the seat backrest frame 2 through the tether 13. The bracket comprises a first end 14A for connecting to the tether 13. For example, the first end 14A of the bracket 14 comprises an opening through which the tether 13 can pass to be connected to the first end 14A. The bracket 14 comprises a second end 14B for connecting to the seat backrest frame 2. For example, the second end 14B of the bracket 14 can be connected to the seat backrest frame 2 through a hook. It should be noted that the first end 14A and the second end 14B can be connected to the tether 13 and the seat backrest frame 2 by other means, such as bolt, snap-fit, rivet and the like. Furthermore, the bracket 14 may further comprise a mounting hole 14C through which a bolt can pass to fix the bracket 14 to the seat backrest frame 2.

The bracket 14 as described above is separately provided to supplementarily connect the tether 13 to the seat backrest frame 2. However, the bracket 14 may be implemented in other ways. For example, the bracket 14 may be integrally formed with the seat backrest frame 2.

According to an embodiment of the disclosure, the tether 13 can be pre-folded to connect the airbag 12 and the seat backrest frame 2 in a shortened form. As shown in FIG. 3, the tether 13 comprises a folded portion 13A and a fixed portion 13B. The folded portion 13A is formed from a section of the tether being folded. The fixed portion 13B is provided to fix and prevent the folded portion 13A from being unfolded when the folded portion 13A is not pulled.

When the airbag assembly 1 uses the tether 13 comprising the folded portion 13A and the fixed portion 13B, the fixed portion 13B should be provided in such a way that: when the airbag 12 is not inflated, the fixed portion 13B can maintain the folded portion 13A in its folded state; and when the airbag 12 is deployed and thus pulls the tether 13, the fixed portion 13B can be broke.

According to an embodiment of the disclosure, the fixed portion 13B is tear stitching which is sewed with thread in the folded portion 13A. However, the fixed portion 13B may be provided in other ways so long as it can meet the above requirements. For example, the fixed portion 13B may maintain the folded portion 13A in its folded state through hook-and-loop fastener, pressure-sensitive adhesive and the like.

In operation, when the airbag 12 is inflated and deployed, it applies a pulling force on the tether 13, such that the fixed portion 13B is broke and the folded portion 13A is unfolded gradually from its folded state. Accordingly, the tether 13 is stretched between the airbag 12 and the seat backrest frame 2. With the pre-folded and fixed tether 13, it is possible to control the unfolding process of the tether 13, thereby providing a beneficial control of the speed, shape and/or direction of the deployment of the airbag 12 and a more effective protection for the passengers.

The airbag assembly 1 as described above comprises the airbag housing 11. However, the airbag assembly of the disclosure can be implemented in other ways. According to some embodiments of the disclosure, the airbag assembly 1 may be implemented without airbag housing. In this case, the airbag 12 of the airbag assembly 1 can be directly connected to the seat backrest frame 2.

According to an embodiment of the disclosure, in the process of connecting the airbag assembly 1 to the seat backrest frame 2, the upper portion of the airbag 12 is directly connected to the bent portion 21 of the seat backrest frame 2, and the lower portion of the airbag 12 is directly fixed to the straight portion 22 of the seat backrest frame 2. For example, the upper portion of the airbag 12 can be connected to the bent portion 21 of the seat backrest frame 2 through a releasable connection, such as tether, stitching, hook-and-loop fastener, snap-fit, hook and the like; and the lower portion of the airbag 12 can be connected to the straight portion 22 of the seat backrest frame 2 through bolt, snap-fit, adhesive and the like. Furthermore, the airbag 12 may also be connected to the seat backrest frame 2 through the bracket 14 as described above.

According to an embodiment of the disclosure, after the airbag 12 is connected to the seat backrest frame 2, the upper portion of the airbag 12 is substantially pressed against the bent portion 21 of the seat backrest frame 2 in a bent state, as shown in FIG. 2. By releasably connecting the upper portion of the airbag 12 to the seat backrest frame 2, when the airbag 12 is being inflated, the connection between the upper portion of the airbag 12 and the seat backrest frame 2 will be released, such that the airbag 12 will gradually return to a substantially upright state from the bent state and thus will be finally deployed in its substantially upright state.

A filling 3 is filled around the airbag 12 and the seat backrest frame 2. When the airbag 12 is connected to the seat backrest frame 2 in a bent state, the filling 3 surrounds the airbag 12 and thus further restrains the airbag 12 in its bent state. According to an embodiment of the disclosure, the filling 3 is a foaming filling formed in foaming process. With the filling 3 surrounding the airbag 12 and the seat backrest frame 2, it is possible to stably maintain the airbag 12 in the bent state, such that it is avoided to release the connection of the airbag 12 and the seat backrest frame 2 before the airbag 12 is inflated, thereby improving reliability of the airbag 12.

When the airbag assembly 1 has no airbag housing, the airbag assembly 1 may further comprise a tether 13 provided on the airbag 12. As shown in FIG. 3, a first end of the tether 13 is connected to the airbag 12 and a second end of the tether 13 is connected to the seat backrest frame 2. The structure and connection of the tether 13 refer to the above description, and thus will not be explained here.

The airbag housing 11 as described above stores the entire airbag 12 therein. However, the airbag housing of the disclosure is not limited to this. According to an embodiment of the disclosure, the airbag housing 11 can be designed to store only a part of the airbag 12. For example, the airbag housing 11 can be designed to store only the lower portion of the airbag 12. In this case, the lower portion of the folded airbag 12 is disposed in an accommodating space of the airbag housing 11, and the upper portion of the airbag 12 extends beyond the airbag housing 11. That is to say, an upper end of the airbag housing 11 is not closed such that the airbag 12 can have a part stored in the airbag housing 11 and the other part outside the airbag housing 11. According to some embodiments of the disclosure, the airbag housing 11 can be made of hard materials or flexible materials (such as flexible woven fabric).

According to some embodiments of the disclosure, the upper portion of the airbag 12 is directly connected to the bent portion 21 of the seat backrest frame 2. The direct connection of the airbag 12 to seat backrest frame 2 refers to the above description, and thus will not be explained here. Furthermore, the lower portion of the airbag 12 is connected to the straight portion 22 of the seat backrest frame 2 through the airbag housing 11. The connection of the airbag housing 11 to the seat backrest frame 2 refers to the above description, and thus will not be explained here.

If the airbag housing 11 of the airbag assembly 1 stores only a part of the airbag 12 and the airbag assembly 1 is mounted at the seat backrest frame of the vehicle, the portion of the airbag 12 extending beyond the airbag housing 11 can be acted on by an external force and thus can be pressed against a bent portion of the seat backrest frame in a bent state.

Preferably, the airbag assembly 1 according to the embodiments of the disclosure is mounted at a side of the vehicle front seat (driver seat to front passenger seat) away from its neighboring vehicle door. For example, if the airbag assembly 1 is used for the driver seat, it is mounted at a side of the driver seat facing towards the front passenger seat. However, the airbag assembly 1 according to the embodiments of the disclosure can be applied in other ways. For example, the airbag assembly 1 may also be mounted at a side of the front seat facing towards its neighboring vehicle door or at a side of a rear seat.

There is also provided a vehicle seat. Referring to FIG. 2, the vehicle seat according to the disclosure comprises the airbag assembly 1, the seat backrest frame 2 and the filling 3 as described above. The structure of the airbag assembly 1 refers to the above description, and thus will not be explained here. The seat backrest frame 2 provides a support for the vehicle seat, and the filling 3 encloses the seat backrest frame 2 and the airbag assembly 1 for passenger comfortableness. Furthermore, the vehicle seat according to the disclosure may also comprise a seat cushion, a headrest, a seat cover and other components not shown here.

Though the present invention has been described above with reference to exemplary embodiments, it should be noted that the present invention is not limited to the configurations and methods of the above exemplary embodiments. Contrarily, the present invention is intended to cover various modifications and equivalents. Furthermore, though various exemplary combinations and structures disclose various elements and method steps of the disclosure, other combinations including more or less elements or steps also fall into the scope of the present disclosure.

What is claimed is:

1. An airbag assembly for a vehicle front seat, the vehicle front seat including a backrest frame, the airbag assembly comprising:
    a folded airbag adapted to be inflated with gas and to be carried by the backrest frame; and
    a tether for controlling deployment of the airbag, a first end of the tether connected to the airbag and a second end of the tether for interconnection with the backrest frame, the tether including, a folded portion formed from a section of the tether being folded and a fixed portion disposed at the folded portion to retain the folded portion, the fixed portion breakable in response to inflation of the airbag such that the folded portion of the tether will be unfolded gradually from a folded state,
    wherein the airbag assembly is adapted to be mounted at a side of the vehicle front seat away from a neighboring vehicle door,
    wherein the airbag is configured to be disposed along a side contour of the backrest frame in a bent state, and
    wherein the airbag assembly is adapted to be mounted at a lateral side of the backrest frame.

2. The airbag assembly according to claim 1, wherein the tether and the airbag are integrally formed.

3. The airbag assembly according to claim 2, further comprising a bracket for connecting airbag to the backrest frame,
    wherein the bracket comprises a first end for connecting to the tether and a second end for connecting to the backrest frame.

4. The airbag assembly according to claim 1, further comprising:
    an airbag housing for at least partly storing the folded airbag, wherein the airbag is at least partly connected to the backrest frame through the airbag housing.

5. The airbag assembly according to claim 4, wherein the airbag housing is formed of flexible woven fabric, and
    wherein the folded airbag is entirely contained in the airbag housing, the airbag housing is configured to be disposed along a side contour of the backrest frame, and at least a part of the airbag housing is pressable against a bent portion of the backrest frame in a bent state.

6. The airbag assembly according to claim 4,
    wherein a lower portion of the airbag is connected to the backrest frame through the airbag housing, and an upper portion of the airbag is connected to the backrest frame and pressed against a bent portion of the backrest frame in a bent state.

7. A vehicle seat comprising:
    a backrest frame; and
    an airbag assembly comprising:
        a folded airbag adapted to be inflated with gas and connected to the backrest frame; and
        a tether for controlling deployment of the airbag, a first end of the tether connected to the airbag and a second end of the tether for interconnection with the backrest frame, the tether including, a folded portion formed from a section of the tether being folded and a fixed portion disposed at the folded portion to retain the folded portion, the fixed portion breakable in response to inflation of the airbag such that the folded portion of the tether will be unfolded gradually from a folded state.

8. The vehicle seat of claim 7, wherein the airbag assembly is mounted at a lateral side of the backrest frame.

9. The vehicle seat of claim 7, wherein the vehicle seat is a front vehicle seat, and the airbag assembly is mounted at a side of the vehicle front seat away from a neighboring vehicle door.

10. The vehicle seat of claim 7, wherein the airbag is configured to be restrained by the tether and the filling so as to be disposed along a side contour of the backrest frame in a bent state.

11. An airbag assembly for a vehicle seat comprising:
    an airbag housing for mounting to the vehicle seat;
    a folded airbag adapted to be inflated with gas and stored within the airbag housing;
    a filling around the airbag housing and a portion of the vehicle seat, the filling surrounding the flexible portion of the airbag housing for retaining the airbag housing in a bent state; and
    wherein the airbag housing includes a flexible portion bendable from a straight configuration to a curved configuration for flexibly conforming with a surface of the vehicle seat, the flexible portion is bendable from a straight configuration in response to an external force and returns to the straight configuration when not subject to the external force.

12. The airbag assembly of claim 11, further comprising a tether for controlling deployment of the airbag, a first end of the tether connected to the airbag and a second end of the tether for interconnection with the backrest frame.

13. The airbag assembly of claim 12, wherein the tether includes a folded portion formed from a section of the tether being folded and a fixed portion disposed at the folded portion to retain the folded portion, the fixed portion breakable in response to inflation of the airbag such that the folded portion of the tether will be unfolded gradually from a folded state.

14. The airbag assembly of claim 12 in combination with the vehicle seat, wherein the tether maintains the airbag housing in the curved configuration conforming with the surface of the vehicle seat.

15. The airbag assembly in combination with the vehicle seat of claim 14, wherein the flexible portion of the housing is releasable connected to the vehicle seat by the tether.

16. An airbag assembly for a vehicle seat comprising:
    an airbag housing for mounting to the vehicle seat;
    a folded airbag adapted to be inflated with gas and stored within the airbag housing;
    wherein the airbag housing includes a flexible portion bendable from a straight configuration to a curved configuration for flexibly conforming with a surface of the vehicle seat, the flexible portion is bendable from a straight configuration in response to an external force and returns to the straight configuration when not subject to the external force, a tether for controlling deployment of the airbag, a first end of the tether connected to the airbag and a second end of the tether for interconnection with the backrest frame, wherein the tether includes a folded portion formed from a section of the tether being folded and a fixed portion disposed at the folded portion to retain the folded portion, the fixed portion breakable in response to inflation of the airbag such that the folded portion of the tether will be unfolded gradually from a folded state.

* * * * *